United States Patent Office 3,196,124
Patented July 20, 1965

3,196,124
GRAFT COPOLYMERS FROM MONOMERS OF NORBORNENES, ACRYLATES, ACRYLICS, AND AMINE-ALDEHYDE AND INKS THEREOF
Norman G. Gaylord, New Providence, N.J., assignor to Interchemical Corporation, New York, N.Y., a corporation of Ohio
No Drawing. Filed Apr. 16, 1962, Ser. No. 187,971
5 Claims. (Cl. 260—30.6)

This is a continuation-in-part of my application S.N. 817,723 filed June 3, 1959, and now abandoned.

This invention relates to new and useful polymeric materials made by addition polymerization and to ink compositions containing the same. More particularly it relates to new graft copolymers incorporating both acrylic copolymers containing the norbornene nucleus and amine-formaldehyde resins. These new graft copolymers, which are more fully defined below, have unusually good pigment wetting and dispersing properties and have been found to provide excellent binders when used in novel high heat resistant white inks.

These novel white inks retain their color and do not yellow when baked and rebaked at temperatures as high as 204° C. In addition to these high heat resistance properties, the novel white inks of this invention are scratch resistant, quick drying, show good adhesion and are resistant to alkaline pasteurization and steam processing.

In many industries, particularly the food canning industries, there exists a demand for a white ink which when applied to tin plate or tin cans is capable of withstanding the various processes to which said can is subjected. These processes include alkaline pasteurization, steam processing and, most important, baking and rebaking at temperatures as high as 204° C. Since most inks tend to discolor or yellow when subjected to such making schedules, an ink which can retain its whiteness under such high heat is a very desirable commercial product.

The novel graft copolymers of this invention provide the binders for these novel high heat resistant white inks.

The term "graft copolymers" as used in this specification should be here defined and distinguished from ordinary copolymers. The term "copolymers" as used in this specification covers the reaction products obtained by the addition polymerization of a mixture of two or more ethylenically unsaturated monomeric compounds. The resultant copolymers contain the polymerized monomeric groupings of the monomers present distributed within the molecule in either a regular or a random manner. In contrast, "graft copolymers" covers polymeric products obtained by addition polymerization of a mixture of two or more monomers in the presence of a preformed resin, or polymer, in such manner that the monomeric unit copolymerizes to form attached, or grafted, side chains, or branches, on the preformed polymer. The important structural characteristic of graft copolymers is that the composition of monomers constituting the backbone may be different from those constituting the branches.

In the present invention, a mixture of monomers including 5% to 30% by weight of 2-hydroxymethyl-5-norbornene, 60 to 95% by weight of at least one acrylic type ester having the formula:

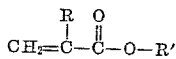

where R is a member selected from the group consisting of hydrogen, methyl and ethyl and R' is an alkyl radical containing from 1 to 8 carbon atoms and 0 to 35% by weight of an unsaturated carboxylic acid such as methacrylic acid undergo addition polymerization by the conventional free radical method in an organic solution in the presence of an amine-formaldehyde resin such as triazine-formaldehyde resin. This results in a graft copolymer wherein side chains comprising the addition products of the above monomers are grafted upon a backbone comprising the triazine-formaldehyde resin.

Without absolute commitment on the theory involved, it is believed that by means of a chain transfer mechanism, centers are activated along the main triazine-formaldehyde backbone. This results in the relocation of the free radical source to these centers and the consequent generation of branch copolymers by the polymerization from these centers of the monomers capable of being polymerized by a free radical mechanism.

Copending application Serial Number 763,839 filed October 22, 1958, now U.S. Patent 2,985,611, disclosed an acrylic type copolymer containing the norbornene nucleus. It is the copolymer covered by said application which in effect provides side chains of the new graft copolymer of this invention. It should be noted that norbornene has the formula

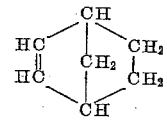

while for the purposes of describing the present invention, reference is primarily made to copolymers of 2-hydroxymethyl-5-norbornene which has the following structure

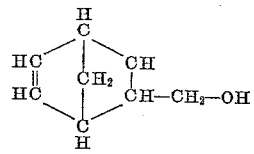

it will be understood that related homologs can readily be used and it is intended that the appended claims will cover the use of such compounds.

2-hydroxymethyl-5-norbornene is readily prepared by condensing allyl alcohol with cyclopentadiene (U.S. Patents No. 2,596,279 and No. 2,353,606). Alkyl substituted cyclopentadienes behave similarly to yield corresponding substituted derivatives. Likewise compounds containing two alcoholic hydroxyl groups can be obtained by condensing an unsaturated diol, such as butenediol with cyclopentadiene.

The addition polymerization is initiated by conventional polymerization initiators of the free radical type in solution. The most commonly used initiators are azo compounds organic peroxygen compounds. Benzoyl peroxide is preferably used.

Reference is made to the disclosure of copending Patent 2,985,611, mentioned above, in which triazine-formaldehyde resins are described as being the reaction products of formaldehyde and triazines, said products including ammeline-formaldehyde, benzoguanamine-formaldehyde, melamine-formaldehyde and substituted melamine-formaldehyde resins.

In preparing the white ink vehicle of this invention, a solvent comprising 3:1 ratio of tributyl phosphate:aliphatic hydrocarbon having a 278–306° C. boiling range is preferably used. This ratio is not critical and other ratios of these ingredients may be used.

It should be noted that blending of triazine-formaldehyde resins and the acrylic type copolymers, described above as covered under copending application S.N. 768,839 in a solvent comprising a mixture of tributyl phosphate and an aliphatic hydrocarbon in the above mentioned ratios, in an attempt to produce an ink vehicle, resulted in incompatible blends, which were unstable and showed precipitation.

In the preparation of the graft copolymer, it should be remembered that the 2-hydroxymethyl-5-norbornene tends to be somewhat less reactive under copolymerization conditions than typical acrylic monomers, such as acrylic acid, methacrylic acid, their alkyl esters, etc. Accordingly, if they are mixed initially with all of the other polymerizable monomers with which they are to be polymerized, the tendency is for the most reactive monomers to polymerize or copolymerize by themselves at first, with the norbornene alcohol remaining essentially unreacted until the supply of more reactive molecules is substantially exhausted. Such conditions do not favor efficient and uniform incorporation of these less reactive monomers into a graft copolymer. We have found that efficient and relatively uniform incorporation of 2-hydroxymethyl-5-norbornene into acrylate copolymer side chains occurs when the acrylate and other highly reactive monomers are added slowly (with a catalyst or reaction initiator) to the norbornene alcohol in the presence of the triazine-formaldehyde resin. Accordingly, most of the examples which follow will illustrate this technique.

While rutile titanium dioxide is the pigment used in the following examples it will be apparent to those skilled in the art that other white pigments may also be used.

The following examples will illustrate this invention:

*Example 1*

To a mixture of 46 g. of 2-hydroxymethyl-5-norbornene, 87 g. of Uformite QR 336, a solid butylated benzoguanamine-formaldehyde resin, and 45 g. of tributyl phosphate maintained at 90° C., a solution of 270 g. of ethylhexyl acrylate, 17 g. of methacrylic acid, 135 g. of an aliphatic hydrocarbon solvent having a boiling range of 279–306° C. and 8.4 g. of benzoyl peroxide are added dropwise over a period of 1½ hours. The mixture is maintained at 90° C. for an additional 1½ hours, at which time, 2.1 g. of benzoyl peroxide are added. The mixture is then maintained at 90° C. for another 2½ hours. A solids determination indicates a solids content of 61% by weight which in turn indicates an 87.2% conversion of monomers to copolymer. The resulting solution has a viscosity of 2235 poises.

A white ink is prepared by adding 25 g. of rutile titanium dioxide pigment to 25 g. of the resulting solution. The ink is drawn down on a tin plate panel and tested for discoloration on high heat baking and rebaking. No coloration of the white ink occurs at a baking schedule of up to 10 minutes initial bake at 149° C. and 10 minutes of rebake at 204° C. This indicates that the ink has very desirable color retention properties at high heat baking schedules.

Films of the ink show good drying characteristics. They dry in 5 minutes at a temperature of 149° C.

Baked films of the ink displayed good alkaline pasteurization resistance and steam processing resistance.

Tin plate panels coated with a baked film of the ink remained unchanged after being immersed in an alkaline pasteurization solution for 20 minutes at a temperature of 60° C. The coated tin plate panel also withstood contact with steam at 15 lbs. steam pressure for 1½ hours.

*Example 2*

Example 1 is repeated using the following compounds:

| | G. |
|---|---|
| 2-hydroxymethyl-5-norbornene | 41 |
| Butylated benzoguanamine-formaldehyde (Uformite QR 336) | 80 |
| Ethylhexyl acrylate | 244 |
| Methacrylic acid | 15 |
| Tributyl phosphate | 100 |
| Aliphatic hydrocarbon (278° to 306° C. boiling range) | 300 |
| Benzoyl peroxide (1st addition) | 6 |
| Benzoyl peroxide (2nd addition) | 1.5 |

The resulting solution has a 40.9% solids content by weight and a viscosity of Z, on the Gardner-Holdt Scale.

A white ink is prepared by adding 25 g. of rutile titanium dioxide pigment to 25 g. of the resulting solution. When drawn on tin plate and subjected to the same series of tests as the ink of Example 1, this ink displays properties which are equivalent to those of the ink of Example 1.

While there have been described herein what are considered to be the preferred embodiments of this invention, it will be understood that the practice of this invention is not limited to the resins and coatings described in the specific examples but that various modifications may be made therein without departing from the scope of the invention as it is defined in the appended claims.

What is claimed is:

1. A graft copolymer comprising the addition polymerization product of (A) a mixture of monomers including 5% to 30% by weight of 2-hydroxymethyl-5-norbornene, 60 to 95% by weight of at least one acrylic type ester having the formula:

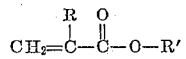

where R is a member selected from the group consisting of hydrogen, methyl and ethyl and R′ is an alkyl radical containing from 1 to 8 carbon atoms and up to 35% by weight of methacrylic acid and (B) benzoguanamine formaldehyde resins.

2. A graft copolymer according to claim 1 being the addition polymerization product of 2-hydroxymethyl-5-norbornene, ethylhexyl acrylate, methacrylic acid and a solid butylated triazine-formaldehyde resin.

3. A heat curable white ink composition comprising a solution of the graft copolymer claimed in claim 1 in a solvent including tributyl phosphate and a high boiling aliphatic hydrocarbon, and a suitable white pigment dispersed in said solution.

4. The white ink composition defined in claim 3, wherein said solvent includes 3 parts by weight of a high boiling aliphatic hydrocarbon and 1 part by weight of tributyl phosphate.

5. A heat curable white ink composition comprising a solution of the graft copolymer claimed in claim 2 in a solvent including tributyl phosphate and a high boiling aliphatic hydrocarbon, and a suitable white pigment dispersed in said solution.

References Cited by the Examiner

UNITED STATES PATENTS 2,985,611   5/61   Gaylord et al. _____ 260—33.4

MORRIS LIEBMAN, *Primary Examiner.*